US006235700B1

(12) United States Patent
Flynn et al.

(10) Patent No.: US 6,235,700 B1
(45) Date of Patent: May 22, 2001

(54) AZEOTROPE-LIKE COMPOSITIONS AND THEIR USE

(75) Inventors: Richard M. Flynn, Mahtomedi; Dean S. Milbrath, Stillwater; John G. Owens, Woodbury; Daniel R. Vitcak, Cottage Grove, all of MN (US); Hideto Yanome, Kanagawa (JP)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/429,508

(22) Filed: Oct. 28, 1999

Related U.S. Application Data

(62) Division of application No. 09/130,236, filed on Aug. 6, 1998, now Pat. No. 6,063,748, which is a division of application No. 08/649,743, filed on May 15, 1996, now Pat. No. 5,814,595, which is a continuation-in-part of application No. 08/442,399, filed on May 16, 1995, now abandoned.

(51) Int. Cl.[7] ............................. C11D 7/26; C11D 7/30; C11D 7/50
(52) U.S. Cl. .................. 510/411; 510/410; 510/412; 252/364; 252/67; 106/311; 134/42
(58) Field of Search ..................................... 510/411, 410, 510/412; 252/364, 67; 106/311; 134/42

(56) References Cited

U.S. PATENT DOCUMENTS

| | | |
|---|---|---|
| 2,713,593 | 7/1955 | Brice et al. . |
| 3,394,878 | 7/1968 | Eiseman ................................. 252/67 |
| 3,900,372 | 8/1975 | Childs et al. ........................... 204/81 |
| 3,903,012 | 9/1975 | Brandreth .............................. 252/194 |
| 4,726,989 | 2/1988 | Mrozinski ........................... 428/315.5 |
| 5,023,009 | 6/1991 | Merchant .............................. 252/171 |
| 5,023,010 | 6/1991 | Merchant .............................. 252/171 |
| 5,034,424 | 7/1991 | Wenning et al. .................. 521/109.1 |
| 5,064,560 | 11/1991 | Merchant .............................. 252/171 |
| 5,091,104 | 2/1992 | Van Der Puy ...................... 252/171 |
| 5,098,595 | 3/1992 | Merchant .............................. 252/171 |
| 5,125,978 | 6/1992 | Flynn et al. .............................. 134/2 |
| 5,137,932 | 8/1992 | Behme et al. ........................ 521/131 |
| 5,211,873 | 5/1993 | Dams et al. ...................... 252/182.24 |
| 5,264,462 | 11/1993 | Hodson et al. ......................... 521/88 |
| 5,273,592 | 12/1993 | Chi Li .................................... 134/40 |
| 5,275,669 | 1/1994 | Van Der Puy et al. ............... 134/42 |
| 5,466,877 | 11/1995 | Moore ................................... 562/852 |
| 5,484,546 | 1/1996 | Minor et al. ........................... 252/67 |
| 5,718,293 | 2/1998 | Flynn ..................................... 169/45 |
| 5,756,002 * | 5/1998 | Chen et al. ........................... 252/364 |
| 5,792,277 | 8/1998 | Shubkin et al. ....................... 134/19 |
| 5,814,595 | 9/1998 | Flynn et al. .......................... 510/411 |
| 5,827,446 | 10/1998 | Merchant .............................. 252/67 |

FOREIGN PATENT DOCUMENTS

| | | |
|---|---|---|
| 13 02 054 | 2/1970 | (DE) . |
| 1294949 | 5/1989 | (DE) . |
| 450855 * | 10/1991 | (EP) . |
| 0 450 855 A2 | 10/1991 | (EP) . |
| 2287432 | 7/1976 | (FR) . |
| 2274462 | 7/1994 | (GB) . |
| 6-293686 | 10/1994 | (JP) . |
| 8-259995 | of 1995 | (JP) . |
| 7-159821 | 6/1995 | (JP) . |
| WO96/22356 | 7/1996 | (WO) . |

OTHER PUBLICATIONS

1995 American Chemical Society., Predictions of Azeotropes Formed From Fluorinated Ethers, Ethanes, and Propanes. Authors: Gage, C.L.; Kazachki, G. S. Report date: 1992.
Preparation, Properties and Industrial Applications of Organofluorine Compounds, R. E. Banks, ed., John Wiley and Sons, New York, 1982, pp. 19–43.
P.S. Zurer, "Looming Ban on Production of CFCs, Halons Spurs Switch to Substitutes," *Chemical & Engineering News*, p. 12, Nov. 13, 1993.
Y. Tang, Atmospheric Fate of Various Fluorocarbons, M.S. Thesis, Massachusetts Institute of Technology (1993).
H. Kobler et al., *Justus Liebigs Ann. Chem.*, 1978, 1937.
Cooper et al., *Atmos. Environ.* 26A, 7, 1331 (1992).
Intergovernmental Panel, *Climate Change: The IPCC Scientific Assessment*, Cambridge University Press (1990).
B.N. Ellis, *Cleaning and Contamination of Electronics Components and Assemblies*, Electrochemical Publications Limited, Ayr, Scotland, pp. 182–94 (1986).
M.C. Sneed and R.C. Brasted, *Comprehensive Inorganic Chemistry*, vol. 6 (The Alkali Metals), pp. 61–64, D. Van Nostrand Company, Inc., New York 91957).

* cited by examiner

Primary Examiner—Yogendra N. Gupta
Assistant Examiner—Charles Boyer
(74) Attorney, Agent, or Firm—Kent S. Kokko

(57) ABSTRACT

The invention provides azeotrope-like compositions consisting essentially of $R_fOC_2H_5$, where $R_f$ is a branched or straight chain perfluoroalkyl group having 4 carbon atoms, and an organic solvent selected from the group consisting of: straight chain, branched chain and cyclic alkanes having 6 to 8 carbon atoms; esters having 4 carbon atoms; ketones having 4 carbon atoms; disiloxanes having 6 carbon atoms; cyclic and acyclic ethers having 4 to 6 carbon atoms; chlorinated alkanes having 3 to 4 carbon atoms and chlorinated alkenes having 2 carbon atoms. The compositions are useful for cleaning, as solvents or carriers for coating and as heat transfer materials.

12 Claims, No Drawings

AZEOTROPE-LIKE COMPOSITIONS AND THEIR USE

CROSS-REFERENCE TO RELATED APPLICATION

This application is a division of U.S. patent application Ser. No. 09/130,236 filed on Aug. 6, 1998, now U.S. Pat. No. 6,063,748, which is a division of U.S. patent application Ser. No. 08/649,743 filed on May 15, 1996, now U.S. Pat. No. 5,814,595, which was a continuation-in-part of U.S. patent application Ser. No. 08/442,399 filed on May 16, 1995, now abandoned.

FIELD OF THE INVENTION

The invention relates to azeotropes and methods of using azeotropes to clean substrates, deposit coatings and transfer thermal energy.

BACKGROUND

Chlorofluorocarbons (CFCs) and hydrochlorofluorocarbons (HCFCs) have been used in a wide variety of solvent applications such as drying, cleaning (e.g., the removal of flux residues from printed circuit boards), and vapor degreasing. Such materials have also been used in refrigeration and heat transfer processes. While these materials were initially believed to be environmentally benign, they have now been linked to ozone depletion. According to the Montreal Protocol and its attendant amendments, production and use of CFCs must be discontinued (see, e.g., P. S. Zurer, "Looming Ban on Production of CFCs, Halons Spurs Switch to Substitutes," *Chemical & Engineering News*, page 12, Nov. 15, 1993). The characteristics sought in replacements, in addition to low ozone depletion potential, typically have included boiling point ranges suitable for a variety of solvent cleaning applications, low flammability, and low toxicity. Solvent replacements also should have the ability to dissolve both hydrocarbon-based and fluorocarbon-based soils. Preferably, substitutes will also be low in toxicity, have no flash points (as measured by ASTM D3278-89), have acceptable stability for use in cleaning applications, and have short atmospheric lifetimes and low global warming potentials.

Certain perfluorinated (PFCs) and highly fluorinated hydrofluorocarbon (HFCs) materials have also been evaluated as CFC and HCFC replacements in solvent applications. While these compounds are generally sufficiently chemically stable, nontoxic and nonflammable to be used in solvent applications, PFCs tend to persist in the atmosphere, and PFCs and HFCs are generally less effective than CFCs and HCFCs for dissolving or dispersing hydrocarbon materials. Also, mixtures of PFCs or HFCs with hydrocarbons tend to be better solvents and dispersants for hydrocarbons than PFCs or HFCs alone.

Many azeotropes possess properties that make them useful solvents. For example, azeotropes have a constant boiling point, which avoids boiling temperature drift during processing and use. In addition, when a volume of an azeotrope is used as a solvent, the properties of the solvent remain constant because the composition of the solvent does not change. Azeotropes that are used as solvents also can be recovered conveniently by distillation.

There currently is a need for azeotrope or azeotrope-like compositions that can replace CFC- and HCFC-containing solvents. Preferably these compositions would be nonflammable, have good solvent power, cause no damage to the ozone layer and have a relatively short atmospheric lifetime so that they do not significantly contribute to global warming.

SUMMARY

In one aspect, the invention provides azeotrope-like compositions consisting essentially of a hydrofluorocarbon ether and organic solvent. The hydrofluorocarbon ether is represented by the general formula $R_fOC_2H_5$, where $R_f$ is a branched or straight chain perfluoroalkyl group having 4 carbon atoms and the organic solvent is selected from the group consisting of: straight chain, branched chain and cyclic alkanes containing 6 to 8 carbon atoms, esters containing 4 carbon atoms, ketones containing 4 carbon atoms, siloxanes containing 6 carbon atoms, cyclic and acyclic ethers containing 4 to 6 carbon atoms, chlorinated alkanes containing 3 to 4 carbon atoms, chlorinated alkenes having 2 to 3 carbon atoms, alcohols containing one to four carbon atoms, fluorinated alcohols having 3 carbon atoms, 1-bromopropane and acetonitrile. While the concentrations of the hydrofluorocarbon ether and organic solvent included in an azeotrope-like composition may vary somewhat from the concentrations found in the azeotrope formed between them and remain a composition within the scope of this invention, the boiling points of the azeotrope-like compositions will be substantially the same as those of their corresponding azeotropes. Preferably, the azeotrope-like compositions boil at ambient pressure at temperatures that are within about 1° C. of the temperatures at which their corresponding azeotropes boil at the same pressure.

In another aspect, the invention provides a method of cleaning objects by contacting the object to be cleaned with one or more of the azeotrope-like compositions of this invention or the vapor of such compositions until undesirable contaminants or soils on the object are dissolved, dispersed or displaced and rinsed away.

In yet another aspect, the invention also provides a method of coating substrates using the azeotrope-like compositions as solvents or carriers for the coating material. The process comprises the step of applying to at least a portion of at least one surface of a substrate a liquid coating composition comprising: (a) an azeotrope-like composition, and (b) at least one coating material which is soluble or dispersible in the azeotrope-like composition. Preferably, the process further comprises the step of removing the azeotrope-like composition from the liquid coating composition, for example, by evaporation.

The invention also provides coating compositions comprising an azeotrope-like composition and coating material which are useful in the aforementioned coating process.

In yet another aspect, the invention provides a method of transferring thermal energy using the azeotrope-like compositions as heat transfer fluids.

DETAILED DESCRIPTION

The azeotrope-like compositions are mixtures of hydrofluorocarbon ether and organic solvent which, if fractionally distilled, produce a distillate fraction that is an azeotrope of the hydrofluorocarbon ether and organic solvent.

The azeotrope-like compositions boil at temperatures that are essentially the same as the boiling points of their corresponding azeotropes. Preferably, the boiling point of an azeotrope-like composition at ambient pressure is within about 1° C. of the boiling point of its azeotrope measured at the same pressure. More preferably, the azeotrope-like compositions will boil at temperatures that are within about 0.5° C. of the boiling points of their corresponding azeotropes measured at the same pressure.

The concentrations of the hydrofluorocarbon ether and organic solvent in a particular azeotrope-like composition may vary substantially from the amounts contained in the composition's corresponding azeotrope, and the magnitude of such permissible variation depends upon the organic solvent used to make the composition. Preferably, the concentrations of hydrofluorocarbon ether and organic solvent in an azeotrope-like composition vary no more than about ten percent from the concentrations of such components contained in the azeotrope formed between them at ambient pressure. More preferably, the concentrations are within about five percent of those contained in the azeotrope. Most preferably, the azeotropic composition contains essentially the same concentrations of the ether and solvent as are contained in the azeotrope formed between them at ambient pressure. Where the concentrations of ether and organic solvent in an azeotrope-like composition differ from the concentrations contained in the corresponding azeotrope, the preferred compositions contain a concentration of the ether that is in excess of the ether's concentration in the azeotrope. Such compositions are likely to be less flammable than azeotrope-like compositions in which the organic solvent is present in a concentration that is in excess of its concentration in the azeotrope. The most preferred compositions will exhibit no significant change in the solvent power of the composition over time.

The azeotrope-like compositions of this invention may also contain, in addition to the hydrofluorocarbon ether and organic solvent, small amounts of other compounds which do not interfere in the formation of the azeotrope. For example, small amounts of surfactants may be present in the azeotrope-like compositions of the invention to improve the dispersibility or solubility of materials, such as water, soils or coating materials (e.g., perfluoropolyether lubricants and fluoropolymers), in the azeotrope-like composition. Azeotropes or azeotrope-like compositions containing as a component 1,2-trans-dichloroethylene preferably also contain about 0.25 to 1 weight percent of nitromethane and about 0.05 to 0.4 weight percent of epoxy butane to prevent degradation of the 1,2-trans-dichloroethylene. Most preferably, such compositions will contain about 0.5 weight percent nitromethane and 0.1 weight percent of the epoxy butane.

The characteristics of azeotropes are discussed in detail in Merchant, U.S. Pat. No. 5,064,560 (see, in particular, col. 4, lines 7–48).

The hydrofluorocarbon ether useful in the invention can be represented by the following general formula:

$$R_f\text{—O—}C_2H_5 \qquad (I)$$

where, in the above formula, $R_f$ is selected from the group consisting of linear or branched perfluoroalkyl groups having 4 carbon atoms. The ether may be a mixture of ethers having linear or branched perfluoroalkyl $R_f$ groups. For example, perfluorobutyl ethyl ether containing about 95 perfluro-n-butyl ethyl ether and 5 weight percent perfluoroisobutyl ethyl ether and perfluorobutyl ethyl ether containing about 15 to 35 weight percent perfluoroisobutyl ethyl ether and 85 to 65 weight percent perfluoro-n-butyl ethyl ether are also useful in this invention.

The hydrofluorocarbon ether can be prepared by alkylation of: $CF_3CF_2CF_2CF_2O^-$, $CF_3CF(CF_3)CF_2O^-$, $C_2F_5C(CF_3)FO^-$, $C(CF_3)_3O^-$ and mixtures thereof. The aforementioned perfluoroalkoxides can be prepared by reaction of: $CF_3CF_2CF_2C(O)F$, $CF_3CF(CF_3)C(O)F$ and $C_2F_5C(O)CF_3$, and mixtures thereof, with any suitable source of anhydrous fluoride ion such as anhydrous alkali metal fluoride (e.g., potassium fluoride or cesium fluoride) or anhydrous silver fluoride in an anhydrous polar, aprotic solvent in the presence of a quaternary ammonium compound such as "ADOGEN 464" available from the Aldrich Chemical Company. The perfluoroalkoxide, $C(CF_3)_3O^-$, can be prepared by reacting $C(CF_3)_3OH$ with a base such as KOH in an anhydrous polar, aprotic solvent in the presence of a quaternary ammonium compound. General preparative methods for the ethers are also described in French Patent No. 2,287,432 and German Patent No. 1,294,949.

Suitable alkylating agents for use in the preparation include dialkyl sulfates (e.g., diethyl sulfate), alkyl halides (e.g., ethyl iodide), alkyl p-toluenesulfonates (e.g., ethyl p-toluenesulfonate), alkyl perfluoroalkanesulfonates (e.g., ethyl perfluoromethanesulfonate), and the like. Suitable polar, aprotic solvents include acyclic ethers such as diethyl ether, ethylene glycol dimethyl ether, and diethylene glycol dimethyl ether; carboxylic acid esters such as methyl formate, ethyl formate, methyl acetate, diethyl carbonate, propylene carbonate, and ethylene carbonate; alkyl nitriles such as acetonitrile; alkyl amides such as N,N-dimethylformamide, N,N-diethylformamide, and N-methylpyrrolidone; alkyl sulfoxides such as dimethyl sulfoxide; alkyl sulfones such as dimethylsulfone, tetramethylene sulfone, and other sulfolanes; oxazolidones such as N-methyl-2-oxazolidone; and mixtures thereof.

Perfluorinated acyl fluorides (for use in preparing the hydrofluorocarbon ether) can be prepared by electrochemical fluorination (ECF) of the corresponding hydrocarbon carboxylic acid (or a derivative thereof), using either anhydrous hydrogen fluoride (Simons ECF) or KF.2HF (Phillips ECF) as the electrolyte. Perfluorinated acyl fluorides and perfluorinated ketones can also be prepared by dissociation of perfluorinated carboxylic acid esters (which can be prepared from the corresponding hydrocarbon or partially-fluorinated carboxylic acid esters by direct fluorination with fluorine gas). Dissociation can be achieved by contacting the perfluorinated ester with a source of fluoride ion under reacting conditions (see the methods described in U.S. Pat. No. 3,900,372 (Childs) and U.S. Pat. No. 5,466,877 (Moore)), or by combining the ester with at least one initiating reagent selected from the group consisting of gaseous, non-hydroxylic nucleophiles; liquid, non-hydroxylic nucleophiles; and mixtures of at least one non-hydroxylic nucleophile (gaseous, liquid, or solid) and at least one solvent which is inert to acylating agents.

Initiating reagents which can be employed in the dissociation are those gaseous or liquid, non-hydroxylic nucleophiles and mixtures of gaseous, liquid, or solid, non-hydroxylic nucleophile(s) and solvent (hereinafter termed "solvent mixtures") which are capable of nucleophilic reaction with perfluorinated esters. The presence of small amounts of hydroxylic nucleophiles can be tolerated. Suitable gaseous or liquid, non-hydroxylic nucleophiles include dialkylamines, trialkylamines, carboxamides, alkyl sulfoxides, amine oxides, oxazolidones, pyridines, and the like, and mixtures thereof Suitable non-hydroxylic nucleophiles for use in solvent mixtures include such gaseous or liquid, non-hydroxylic nucleophiles, as well as solid, non-hydroxylic nucleophiles, e.g., fluoride, cyanide, cyanate, iodide, chloride, bromide, acetate, mercaptide, alkoxide, thiocyanate, azide, trimethylsilyl difluoride, bisulfite, and bifluoride anions, which can be utilized in the form of alkali metal, ammonium, alkyl-substituted ammonium (mono-, di-, tri-, or tetra-substituted), or quaternary phosphonium salts, and mixtures thereof Such salts are in general commercially available but, if desired, can be prepared by known methods, e.g., those described by M. C. Sneed and R. C. Brasted in *Comprehensive Inorganic Chemistry*, Volume Six (The Alkali Metals), pages 61–64, D. Van Nostrand Company, Inc., New York (1957), and by H. Kobler et al. in *Justus Liebigs Ann. Chem.*, 1978, 1937. 1,4-diazabicyclo[2.2.2]octane and the like are also suitable solid nucleophiles.

The hydrofluorocarbon ethers used to prepare the azeotrope-like compositions of this invention do not deplete the ozone in the earth's atmosphere and have surprisingly short atmospheric lifetimes thereby minimizing their impact on global warming. Reported in Table 1, is an atmospheric lifetime for the hydrofluorocarbon ether which was calculated using the technique described in Y. Tang, *Atmospheric Fate of Various Fluorocarbons*, M. S. Thesis, Massachusetts Institute of Technology (1993). The results of this calculation are presented in Table 1 under the heading "Atmospheric Lifetime (years)". The atmospheric lifetimes of the hydrofluorocarbon ether and its corresponding hydrofluorocarbon alkane were also calculated using a correlation developed between the highest occupied molecular orbital energy and the known atmospheric lifetimes of hydrofluorocarbons and hydrofluorocarbon ethers that is similar to a correlation described by Cooper et al. in *Atmos. Environ.* 26A, 7, 1331 (1992). These values are reported in Table 1 under the heading "Estimated Atmospheric Lifetime." The global warming potential of the hydrofluorocarbon ether was calculated using the equation described in the Intergovernmental Panel's *Climate Change: The IPCC Scientific Assessment*, Cambridge University Press (1990). The results of the calculation are presented in Table 1 under the heading "Global Warming Potential". It is apparent from the data in Table 1 that the hydrofluorocarbon ether has a relatively short estimated atmospheric lifetime and a relatively small global warming potential. Surprisingly, the hydrofluorocarbon ether also has a significantly shorter estimated atmospheric lifetime than its corresponding hydrofluorocarbon alkane.

TABLE 1

| Compound | Estimated Atmospheric Lifetime (years) | Atmospheric Lifetime (years) | Global Warming Potential (100 year ITH) |
|---|---|---|---|
| $C_4F_9$—$C_2H_5$ | 2.0 | — | — |
| $C_4F_9$—O—$C_2H_5$ | 0.5 | 1.2 | 70 |

Typical organic solvents useful in this invention include straight chain, branched chain and cyclic alkanes containing 6 to 8 carbon atoms (e.g., hexane, heptane, cyclohexane, methylcyclohexane, heptane and isooctane); esters containing 4 carbon atoms (e.g., methyl propionate and ethyl acetate); ketones containing 4 carbon atoms (e.g., methyl ethyl ketone); siloxanes containing 6 carbon atoms (e.g., hexamethyldisiloxane); cyclic and acyclic ethers containing 4 to 6 carbon atoms (e.g., t-amyl methyl ether, 1,4-dioxane, tetrahydrofuran, tetrahydropyran and 1,2-dimethoxyethane); chlorinated alkanes containing 3 to 4 carbon atoms (e.g., 1,2-dichloropropane, 2,2-dichloropropane and 1-chlorobutane); chlorinated alkenes having 2 to 3 carbon atoms (e.g., trans-1,2-dichloroethylene and 2,3-dichloro-1-propene); alcohols containing one to four carbon atoms (e.g., methanol, ethanol, 2-propanol, 1-propanol and t-butanol); fluorinated alcohols having 3 carbon atoms (e.g., pentafluoro-1-propanol and hexafluoro-2-propanol); 1-bromopropane; and acetonitrile.

Preferably, the azeotrope-like compositions are homogeneous. That is, they form a single phase under ambient conditions, i.e., at room temperature and atmospheric pressure.

The azeotrope-like compositions are prepared by mixing the desired amounts of hydrofluorocarbon ether, organic solvent and any other minor components such as surfactants together using conventional mixing means.

The cleaning process of the invention can be carried out by contacting a contaminated substrate with one of the azeotrope-like compositions of this invention until the contaminants on the substrate are dissolved, dispersed or displaced in or by the azeotrope-like composition and then removing (for example by rinsing the substrate with fresh, uncontaminated azeotrope-like composition or by removing a substrate immersed in an azeotrope-like composition from the bath and permitting the contaminated azeotrope-like composition to flow off of the substrate) the azeotrope-like composition containing the dissolved, dispersed or displaced contaminant from the substrate. The azeotrope-like composition can be used in either the vapor or the liquid state (or both), and any of the known techniques for "contacting" a substrate can be utilized. For example, the liquid azeotrope-like composition can be sprayed or brushed onto the substrate, the vaporous azeotrope-like composition can be blown across the substrate, or the substrate can be immersed in either a vaporous or a liquid azeotrope-like composition. Elevated temperatures, ultrasonic energy, and/or agitation can be used to facilitate the cleaning. Various different solvent cleaning techniques are described by B. N. Ellis in *Cleaning and Contamination of Electronics Components and Assemblies*, Electrochemical Publications Limited, Ayr, Scotland, pages 182–94 (1986).

Both organic and inorganic substrates can be cleaned by the process of the invention. Representative examples of the substrates include metals; ceramics; glass; polymers such as: polycarbonate, polystyrene and acrylonitrile-butadiene-styrene copolymer; natural fibers (and fabrics derived therefrom) such as: cotton, silk, linen, wool, ramie; fur; leather and suede; synthetic fibers (and fabrics derived therefrom) such as: polyester, rayon, acrylics, nylon, polyolefin, acetates, triacetates and blends thereof; fabrics comprising a blend of natural and synthetic fibers; and composites of the foregoing materials. The process is especially useful in the precision cleaning of electronic components (e.g., circuit boards), optical or magnetic media, and medical devices and medical articles such as syringes, surgical equipment, implantable devices and prosthesis.

The cleaning process of the invention can be used to dissolve or remove most contaminants from the surface of a substrate. For example, materials such as light hydrocarbon contaminants; higher molecular weight hydrocarbon contaminants such as mineral oils, greases, cutting and stamping oils and waxes; fluorocarbon contaminants such as perfluoropolyethers, bromotrifluoroethylene oligomers (gyroscope fluids), and chlorotrifluoroethylene oligomers (hydraulic fluids, lubricants); silicone oils and greases; solder fluxes; particulates; and other contaminants encountered in precision, electronic, metal, and medical device cleaning can be removed. The process is particularly useful for the removal of hydrocarbon contaminants (especially, light hydrocarbon oils), fluorocarbon contaminants, particulates, and water (as described in the next paragraph).

To displace or remove water from substrate surfaces, the cleaning process of the invention can be carried out as described in U.S. Pat. No. 5,125,978 (Flynn et al.) by contacting the surface of an article with an azeotrope-like composition which preferably contains a non-ionic fluoro-aliphatic surface active agent. The wet article is immersed in the liquid azeotrope-like composition and agitated therein, the displaced water is separated from the azeotrope-like composition, and the resulting water-free article is removed from the liquid azeotrope-like composition. Further description of the process and the articles which can be treated are found in U.S. Pat. No. 5,125,978 and the process can also be carried out as described in U.S. Pat. No. 3,903,012 (Brandreth).

The azeotrope-like compositions can also be used in coating deposition applications, where the azeotrope-like composition functions as a carrier for a coating material to enable deposition of the material on the surface of a substrate. The invention thus also provides a coating composition comprising the azeotrope-like composition and a process for depositing a coating on a substrate surface using the azeotrope-like composition. The process comprises the step of applying to at least a portion of at least one surface of a substrate a coating of a liquid coating composition comprising (a) an azeotrope-like composition, and (b) at least one coating material which is soluble or dispersible in the azeotrope-like composition. The coating composition can further comprise one or more additives (e.g., surfactants, coloring agents, stabilizers, anti-oxidants, flame retardants, and the like). Preferably, the process further comprises the step of removing the azeotrope-like composition from the deposited coating by, e.g., allowing evaporation (which can be aided by the application of, e.g., heat or vacuum).

The coating materials which can be deposited by the process include pigments, lubricants, stabilizers, adhesives, anti-oxidants, dyes, polymers, pharmaceuticals, release agents, inorganic oxides, and the like, and combinations thereof. Preferred materials include perfluoropolyether, hydrocarbon, and silicone lubricants; amorphous copolymers of tetrafluoroethylene; polytetrafluoroethylene; and combinations thereof. Representative examples of materials suitable for use in the process include titanium dioxide, iron oxides, magnesium oxide, perfluoropolyethers, polysiloxanes, stearic acid, acrylic adhesives, polytetrafluoroethylene, amorphous copolymers of tetrafluoroethylene, and combinations thereof Any of the substrates described above (for cleaning applications) can be coated via the process of the invention. The process can be particularly useful for coating magnetic hard disks or electrical connectors with perfluoropolyether lubricants or medical devices with silicone lubricants.

To form a coating composition, the components of the composition (i.e., the azeotrope-like composition, the coating material(s), and any additive(s) utilized) can be combined by any conventional mixing technique used for dissolving, dispersing, or emulsifying coating materials, e.g., by mechanical agitation, ultrasonic agitation, manual agitation, and the like. The azeotrope-like composition and the coating material(s) can be combined in any ratio depending upon the desired thickness of the coating, but the coating material(s) preferably constitute from about 0.1 to about 10 weight percent of the coating composition for most coating applications.

The deposition process of the invention can be carried out by applying the coating composition to a substrate by any conventional technique. For example, the composition can be brushed or sprayed (e.g., as an aerosol) onto the substrate, or the substrate can be spin-coated. Preferably, the substrate is coated by immersion in the composition. Immersion can be carried out at any suitable temperature and can be maintained for any convenient length of time. If the substrate is a tubing, such as a catheter, and it is desired to ensure that the composition coats the lumen wall, it may be advantageous to draw the composition into the lumen by the application of reduced pressure.

After a coating is applied to a substrate, the azeotrope-like composition can be removed from the deposited coating by evaporation. If desired, the rate of evaporation can be accelerated by application of reduced pressure or mild heat. The coating can be of any convenient thickness, and, in practice, the thickness will be determined by such factors as the viscosity of the coating material, the temperature at which the coating is applied, and the rate of withdrawal (if immersion is utilized).

Objects and advantages of this invention are further illustrated by the following examples, but the particular materials and amounts thereof recited in these examples, as well as other conditions and details, should not be construed to unduly limit this invention.

EXAMPLES

Examples 1–2

The preparation and identification of the azeotrope-like compositions of this invention are described in the following Examples.

Preparation of Ether "A". Ether "A", used to prepare the azeotrope-like compositions and azeotropes of the following Examples was prepared as follows.

A 20 gallon Hastalloy C reactor, equipped with a stirrer and a cooling system, was charged with spray-dried potassium fluoride (7.0 kg, 120.3 mole). The reactor was sealed, and the pressure inside the reactor was reduced to less than 100 torr. Anhydrous dimethyl formamide (22.5 kg) was then added to the reactor, and the reactor was cooled to below 0° C. with constant agitation. Heptafluorobutyryl fluoride (22.5 kg of 58% purity, 60.6 mole) was added to the reactor contents. When the temperature of the reactor reached −20° C., diethyl sulfate (18.6 kg, 120.8 mole) was added to the reactor over a period of approximately two hours. The resulting mixture was then held for 16 hours with continued agitation, was raised to 50° C. for an additional four hours to facilitate complete reaction, and was cooled to 20° C. Then, volatile material (primarily perfluorooxacyclopentane present in the starting heptafluorobutyryl fluoride) was vented from the reactor over a three-hour period. The reactor was then resealed, and water (6.0 kg) was added slowly to the reactor. After the exothermic reaction of the water with unreacted perfluorobutyryl fluoride subsided, the reactor was cooled to 25° C., and the reactor contents were stirred for 30 minutes. The reactor pressure was carefully vented, and the lower organic phase of the resulting product was removed to afford 17.3 kg of material which was 73% $C_4F_9OC_2H_5$. Analysis revealed the product to be approximately 95 wt. % perfluoro-n-butyl ethyl ether and 5 wt. % perfluoro-isobutyl ethyl ether. The product identity was confirmed by GCMS and by $^1H$, $^{19}F$ NMR and IR and boiled at 76.2° C. at 739.6 torr.

Preparation of Ether "B". Into a 100 gallon Hastalloy C reactor with a stirrer and a cooling system was charged 21.8 kg (375.2 mole) of spray-dried potassium fluoride. The reactor was sealed and the pressure inside the reactor was reduced to less than 100 torr. Anhydrous diglyme (139.4 kg), triethylamine (5.44 kg, 53.9 mole), ADOGEN 464™ (1.54 kg, 3.33 mole), diethyl sulfate (62.6 kg, 406 mole) were added to the reactor followed by perfluoroisobutyryl fluoride (86.3 kg of 80% acid fluoride content, 319.6 mole). The resulting mixture was then held at 60° C. for 18 hours with continued agitation, raised to 85° C., then water (20 kg) and 45% aqueous potassium hydroxide (25.4 kg, 203.9 mole) was added to the reaction mixture. After stirring for approximately 30 minutes, the reactor was cooled to 43° C. and an additional 136.2 kg of water was added, followed by 48% aqueous hydrogen fluoride (4.08 kg, 98.1 mole) to obtain a final pH of 7 to 8. The product was separated from the reaction mixture by distillation to obtain 74.0 kg of crude product which was further purified by a second distillation. The process provided a product that was approximately 82 wt. % perfluoro-isobutyl ethyl ether and 18 wt. % perfluoro-n-butyl ethyl ether, which boiled at about 75.0° C. at 739.3 torr. The product identity was confirmed by CGMS, $^1$H and $^{19}$FNMR and IR.

Examples 3–30

Preparation and Identification of Azeotrope Compositions: Ebulliometer Method.

The azeotropes of this invention were initially identified by screening mixtures of hydrofluorocarbon ether and various organic solvents using an ebulliometer or boiling point apparatus (specifically a Model MBP-100 available from Cal-Glass for Research, Inc., Costa Mesa Calif.). The lower boiling component of the test mixtures (typically an amount of 25 to 30 mLs) was added to the boiling point apparatus, heated and allowed to equilibrate to its boiling point (typically about 30 minutes). After equilibration, the boiling point was recorded, a 1.0 mL aliquot of the higher boiling component was added to the apparatus and the resulting mixture was allowed to equilibrate for about 30 minutes at which time the boiling point was recorded. The test continued basically as described above, with additions to the test mixture of 1.0 mL of the higher boiling point component every 30 minutes until 15 to 20 mLs of the higher boiling point component had been added. The presence of an azeotrope was noted when the test mixture exhibited a lower boiling point than the boiling point of the lowest boiling component of the test mixture. The compositions corresponding to the aforementioned boiling points were determined. The composition (volume %) of the organic solvent in the composition was then plotted as a function of boiling point. The azeotrope-like compositions boiling at temperatures within about 1° C. of the respective azeotrope boiling point were then identified from the plot and this compositional data (on a weight % basis) as well as the boiling point range corresponding to the compositions (expressed as the difference between the composition boiling point and the azeotrope boiling point) are presented in Table 2.

The organic solvents used to prepare the azeotrope-like compositions described in these Examples were purchased commercially from the Aldrich Chemical and Fluka Chemical Companies.

TABLE 2

| Ex. | Organic Solvent:Ether | Conc. Solvent (wt %) | Conc. Ether (wt %) | Boiling Temp. Range (° C.) | Pressure (torr) |
|---|---|---|---|---|---|
| 3 | Hexane:Ether A | 27.8–75.5 | 82.2–24.5 | 61.8 | 723 |
| 4 | Heptane:Ether A | 2.5–21.9 | 97.5–78.1 | 73.3 | 711.4 |
| 5 | Isooctane:Ether A | 1.5–17.2 | 98.5–82.8 | 74.9 | 732.6 |
| 6 | Cyclohexane:Ether A | 12.0–47.1 | 88.0–52.9 | 66.7 | 730.5 |
| 7 | Methylcyclohexane:Ether A | 2.2–26.4 | 97.8–73.6 | 73.3 | 733.2 |
| 8 | t-Amyl methyl ether:Ether A | 2.2–35.0 | 97.8–65.0 | 74.5 | 736.6 |
| 9 | Tetrahydrofuran:Ether A | 26.7–80.6 | 73.3–19.4 | 61.4 | 734.2 |
| 10 | Tetrahyropyrran:Ether A | 2.5–30.9 | 97.5–69.18 | 73.8 | 731.9 |
| 11 | 1,4-Dioxane:Ether A | 1.5–17.8 | 98.5–82.2 | 74.7 | 735.7 |
| 12 | 1,2-Dimethoxyethane:Ether A | 4.4–42.5 | 95.6–57.5 | 73.7 | 733.1 |
| 13 | Ethyl Acetate:Ether A | 11.4–66.7 | 88.6–33.3 | 71.0 | 740.1 |
| 14 | Methyl Propionate:Ether A | 11.6–62.3 | 88.4–37.8 | 71.3 | 737.4 |
| 15 | Methyl Ethyl Ketone:Ether A | 9.0–34.2 | 91.0–65.8 | 71.0 | 729.6 |
| 16 | Methanol:Ether A | 6.4–64.9 | 93.6–35.1 | 52.6 | 720.5 |
| 17 | Ethanol:Ether A | 5.7–45.2 | 94.3–54.8 | 61.7 | 722.2 |
| 18 | 2-Propanol:Ether A | 6.3–19.8 | 93.7–80.2 | 63.7 | 729.2 |
| 19 | 1-Propanol:Ether A | 4.7–30.6 | 95.3–69.4 | 69.8 | 732.6 |
| 20 | t-Butanol:Ether A | 7.0–38.9 | 93.0–61.1 | 67.3 | 735.6 |
| 21 | Pentafluoro-1-Propanol:Ether | 15.7–54.3 | 84.3–45.7 | 67.9 | 735.2 |
| 22 | Hexafluoro-2-Propanol:Ether | 62.6–98.2 | 37.4–1.8 | 56.6 | 735.7 |
| 23 | Hexamethyl Disiloxane:Ether | 2.2–15.8 | 97.8–84.2 | 75.1 | 738.1 |
| 24 | 1-Chlorobutane:Ether A | 11.3–61.5 | 88.7–38.5 | 69.1 | 735.7 |
| 25 | 1,2-Dichloropropane:Ether A | 6.4–29.4 | 93.6–70.6 | 73.8 | 737.6 |
| 26 | 2,2-Dichloropropane:Ether A | 23.6–60.0* | 76.4–40.0* | 66.4 | 730.8 |
| 27 | trans-1,2- | 53.9–95.5 | 46.1–4.5 | 43.8 | 728.7 |
| 28 | 2,3-Dichloro-1-Propene:Ether | 5.1–32.1 | 94.9–67.9 | 72.8 | 735.2 |
| 29 | 1-Bromopropane:Ether A | 22.0–79.1 | 78.0–20.9 | 63.2 | 725 |
| 30 | Acetonitrile:Ether A | 6.4–55.0 | 93.6–45.0 | 65.4 | 739 |

*Estimated value based upon symmetrical Boiling Point Curve.

Examples 31–72

Preparation and Characterization of the Azeotrope-like Compositions by the Distillation Method.

Mixtures of hydrofluorocarbon ether and organic solvents which exhibited a boiling point depression in the Ebulliometer Method were evaluated again to more precisely determine the composition of the azeotrope. Mixtures of the hydrofluorocarbon and the organic solvent of interest were prepared and distilled in a concentric tube distillation column (Model 9333 from Ace Glass, Vineland N.J.). The distillation was allowed to equilibrate at total reflux for at least 60 minutes. In each distillation, six successive distillate samples, each approximately 5 percent by volume of the total liquid charge, were taken while operating the column at a liquid reflux ratio of 20 to 1. The composition of the distillate samples were then analyzed using an BP-5890 Series II Plus Gas Chromatograph with a 30 m HP-5 (cross-linked 5% phenyl methyl silicone gum stationary phase, available from Hewlett Packard Co.), NUKOL (available from Supelco Inc.), or STABIL WAX DA available from Altech Associates) capillary column and a flame ionization detector. The boiling points of the distillate were measured using a thermocouple which was accurate to about 1° C. The compositional data, boiling points and ambient pressures at which the boiling points were measured are reported in Table 3.

The azeotropes were also tested for flammability by placing a small aliquot of the azeotrope in an open aluminum dish and holding a flame source in contact with the vapor of the azeotrope above the dish. Flame propagation across the vapor indicated that the azeotrope was flammable. The flammability data is presented in Table 3 under the heading "Flammability".

TABLE 3

| Ex. | Organic Solvent:Ether | Ether Conc. (wt %) | Organic Solvent Conc. (wt %) | Boiling Point (° C.) | Ambient Pressure (torr) | Flammable |
|---|---|---|---|---|---|---|
| 31 | Hexane:Ether A | 59.7 | 40.3 | 61.5 | 734.1 | Yes |
| 32 | Heptane:Ether A | 92.5 | 7.5 | 73.2 | 737.7 | Yes |
| 33 | Heptane:Ether B | 89.7 | 10.3 | 72.8 | 737.7 | Yes |
| 34 | Isooctane:Ether A | 91.0 | 9.0 | 74.0 | 735.2 | Yes |
| 35 | Isooctane:Ether B | 90.9 | 9.1 | 73.9 | 738.4 | Yes |
| 36 | Cyclohexane:Ether A | 66.5 | 33.5 | 65.8 | 727.7 | Yes |
| 37 | Cyclohexane:Ether B | 74.5 | 25.5 | 65.7 | 731.1 | Yes |
| 38 | Methylcyclohexane:Ether A | 88.6 | 11.4 | 73.3 | 737.7 | Yes |
| 39 | Methylcyclohexane:Ether B | 90.6 | 9.4 | 73.0 | 739.1 | Yes |
| 40 | t-Amyl methyl Ether:Ether A | 85.4 | 14.6 | 73.7 | 737.7 | Yes |
| 41 | t-Amylmethyl Ether:Ether B | 85.2 | 14.8 | 72.9 | 729.4 | Yes |
| 42 | Tetrahydrofuran:Ether A | 55.4 | 44.6 | 62.3 | 741.0 | Yes |
| 43 | Tetrahydrofuran:Ether B | 52.6 | 47.4 | 61.6 | 727.3 | Yes |
| 44 | Tetrahydropyran:Ether A | 83.3 | 16.7 | 76.7 | 742.1 | Yes |
| 45 | 1,4-Dioxane:Ether A | 91.8 | 8.2 | 76.0 | 740.9 | Yes |
| 46 | 1,2-Dimethoxyethane:Ether A | 82.2 | 17.8 | 73.0 | 736.6 | Yes |
| 47 | 1,2-Dimethoxyethane:Ether B | 81.9 | 18.1 | 73.2 | 740.9 | Yes |
| 48 | Ethyl Acetate:Ether A | 68.2 | 31.8 | 69.8 | 736.5 | Yes |
| 49 | Ethyl Acetate:Ether B | 69.3 | 30.7 | 69.7 | 729.4 | Yes |
| 50 | Methyl Propionate:Ether A | 73.0 | 27.0 | 70.8 | 736.6 | Yes |
| 51 | Methyl Ethyl Ketone:Ether A | 86.2 | 13.8 | 70.2 | 734.0 | Yes |
| 52 | Methyl Ethyl Ketone:Ether B | 78.9 | 21.1 | 70.0 | 733.3 | Yes |
| 53 | Methanol:Ether B | 84.5 | 15.5 | 52.3 | 733.2 | Yes |
| 54 | Ethanol:Ether B | 88.0 | 12.0 | 61.3 | 734.1 | Yes |
| 55 | 2-Propanol:Ether B | 87.1 | 12.9 | 64.9 | 734.5 | Yes |
| 56 | t-Butanol:Ether B | 83.7 | 16.3 | 67.3 | 744.2 | Yes |
| 57 | Pentafluoro-1-Propanol:Ether B | 75.3 | 24.7 | 66.6 | 730.5 | Yes |
| 58 | Hexafluoro-2-Propanol:Ether B | 34.7 | 65.3 | 56.0 | 731.2 | No |
| 59 | Hexamethyl Disiloxane:Ether A | 90.6 | 9.4 | 74.2 | 734.0 | Yes |
| 60 | Hexamethyl Disiloxane:Ether B | 89.6 | 10.4 | 74.0 | 743.8 | Yes |
| 61 | 1-Chlorobutane:Ether A | 74.2 | 25.8 | 67.9 | 730.1 | Yes |
| 62 | 1-Chlorobutane:Ether B | 71.9 | 28.1 | 67.7 | 727.3 | Yes |
| 63 | 1,2-Dichloropropane:Ether A | 83.6 | 16.4 | 73.0 | 740.3 | No |
| 64 | 1,2-Dichloropropane:Ether B | 86.8 | 13.2 | 72.9 | 745.8 | No |
| 65 | 2,2-Dichloropropane:Ether A | 54.9 | 45.1 | 67.1 | 738.7 | Yes |
| 66 | 2,2-Dichloropropane:Ether B | 67.7 | 38.3 | 65.6 | 743.8 | Yes |
| 67 | trans-1,2- | 37.3 | 62.7 | 44.5 | 740.6 | No |

TABLE 3-continued

| Ex. | Organic Solvent:Ether | Ether Conc. (wt %) | Organic Solvent Conc. (wt %) | Boiling Point (° C.) | Ambient Pressure (torr) | Flammable |
|---|---|---|---|---|---|---|
| | Dichloroethylene Ether A | | | | | |
| 68 | trans-1,2-Dichloroethylene: Ether B | 31.2 | 68.8 | 44.8 | 737.5 | No |
| 69 | 2,3-Dichloro-1-Propene:Ether A | 81.6 | 18.4 | 72.8 | 739.1 | Yes |
| 70 | 1-Bromopropane: Ether B | 55.0 | 44.0 | 62.1 | 733.5 | Yes |
| 71 | Acetonitrile:Ether A | 83.0 | 17.0 | 65.2 | 736.2 | Yes |
| 72 | Acetonitrile:Ether B | 85.4 | 14.6 | 63.9 | 733.7 | Yes |

Examples 73–114

A number of the azeotrope-like compositions were tested for their ability to dissolve hydrocarbons of increasing molecular weight according to the procedure described in U.S. Pat. No. 5,275,669 (Van Der Puy et al.), the description of which is incorporated herein by reference. The data shown in Table 4 was obtained by determining the largest normal hydrocarbon alkane which was soluble in a particular azeotrope-like composition at a level of 50 volume percent. The hydrocarbon solubilities in the azeotrope-like compositions were measured at both room temperature and the boiling points of the azeotrope-like compositions. The data is reported in Table 4. The numbers in Table 4 under the headings "Hydrocarbon @ RT" and "Hydrocarbon @ BP" correspond to the number of carbon atoms in the largest hydrocarbon n-alkane that was soluble in each of the azeotrope-like compositions at room temperature and the boiling point of the azeotrope-like composition, respectively.

The data in Table 4 shows that hydrocarbon alkanes are very soluble in the azeotrope-like compositions of this invention, and so the azeotrope-like compositions are excellent solvents for the cleaning process of this invention. These compositions will also be effective as solvents for depositing hydrocarbon coatings, e.g., coatings of lubricant, onto substrate surfaces.

TABLE 4

| Ex. | Organic Solvent: Ether | Ether Conc. (wt %) | Organic Solvent Conc. (wt %) | Hydrocarbon @ RT (# carbon atoms) | Hydrocarbon @ BP (# carbon atoms) | Boiling Point (° C.) | Pressure (torr) |
|---|---|---|---|---|---|---|---|
| 73 | Hexane:Ether A | 59.7 | 40.3 | 21 | 24 | 62.3 | 725.1 |
| 74 | Heptane:Ether A | 92.5 | 7.5 | 13 | 18 | 74.3 | 728.6 |
| 75 | Heptane:Ether B | 89.7 | 10.3 | 13 | 20 | 73.7 | 738.9 |
| 76 | Isooctane:Ether A | 91.0 | 9.0 | 13 | 19 | 75.2 | 728.6 |
| 77 | Isooctane:Ether B | 90.9 | 9.1 | 13 | 20 | 74.3 | 736.1 |
| 78 | Cyclohexane: Ether A | 66.5 | 33.5 | 15 | >24 | 66.9 | 724.2 |
| 79 | Cyclohexane: Ether B | 74.5 | 25.5 | 14 | 24–28 | 66.6 | 735.4 |
| 80 | Methylcyclohexane:Ether A | 88.6 | 11.4 | 13 | 19 | 74.3 | 738.7 |
| 81 | Methylcyclohexane:Ether B | 90.6 | 9.4 | 13 | 19 | 74.5 | 736.7 |
| 82 | t-Amylmethyl Ether:Ether A | 85.4 | 14.6 | 15 | 21 | 74.4 | 738.4 |
| 83 | t-Amylmethyl Ether:Ether B | 85.2 | 14.8 | 15 | 22 | 74 | 735.2 |
| 84 | Tetrahydrofuran Ether A | 55.4 | 44.6 | 21 | >24 | 62.8 | 731.8 |
| 85 | Tetrahydrofuran Ether B | 52.6 | 47.4 | 20 | 28–32 | 61.9 | 727.3 |
| 86 | Tetrahydropyran: Ether A | 83.3 | 17.7 | 15 | 23 | 72.4 | 724.8 |
| 87 | 1,4-Dioxane: Ether A | 91.8 | 8.2 | 14 | 19 | 73.7 | 725.8 |
| 88 | 1,2-Dimethoxyethan Ether A | 82.2 | 17.8 | 16 | 22 | 74.3 | 728.6 |
| 89 | 1,2-Dimethoxyethan Ether B | 81.9 | 18.1 | 16 | 23 | 73.7 | 736.8 |

TABLE 4-continued

| Ex. | Organic Solvent: Ether | Ether Conc. (wt %) | Organic Solvent Conc. (wt %) | Hydrocarbon @ RT (# carbon atoms) | Hydrocarbon @ BP (# carbon atoms) | Boiling Point (° C.) | Pressure (torr) |
|---|---|---|---|---|---|---|---|
| 90 | Ethyl Acetate: Ether A | 68.2 | 31.8 | 19 | >24 | 70.7 | 730.6 |
| 91 | Ethyl Acetate: Ether B | 69.3 | 30.7 | 18 | 24to28 | 70.7 | 739.0 |
| 92 | Methyl Propionate: Ether A | 73.0 | 27.0 | 18 | >24 | 71.4 | 732.5 |
| 93 | Methyl Ethyl Ketone:Ether A | 86.2 | 13.8 | 15 | >17 | 71.7 | 732.5 |
| 94 | Methyl Ethyl Ketone:Ether B | 78.9 | 21.2 | 17 | 24to28 | 70.8 | 734.2 |
| 95 | Methanol:Ether B | 84.5 | 15.5 | 11 | 14 | 52.8 | 730.6 |
| 96 | Ethanol:Ether B | 88.0 | 12.0 | 13 | 20 | 65.3 | 730.9 |
| 97 | 2-Propanol: Ether B | 87.1 | 12.9 | 14 | 20 | 65.3 | 730.9 |
| 98 | t-Butanol:Ether B | 83.7 | 16.3 | 15 | 22 | 67.5 | 733.8 |
| 99 | Pentafluoro-1-Propanol:Ether B | 75.3 | 24.7 | 9 | 13 | 67.6 | 733.8 |
| 100 | Hexafluoro-2-Propanol:Ether B | 34.7 | 65.3 | 5 | 8 | 56.9 | 733.6 |
| 101 | Hexamethyl Disiloxane: Ether A | 90.6 | 9.4 | 13 | 18 | 75.7 | 731.9 |
| 102 | Hexamethyl Disiloxane: Ether B | 89.6 | 10.4 | 13 | 20 | 75.1 | 738.5 |
| 103 | 1-Chlorobutane: Ether A | 74.2 | 25.8 | 18 | >24 | 69.2 | 729.8 |
| 104 | 1-Chlorobutane: Ether B | 71.9 | 28.1 | 18 | 24to28 | 68.9 | 740.3 |
| 105 | 1,2-Dichloropropane: Ether A | 83.6 | 16.4 | 15 | 19 | 73.9 | 729.6 |
| 106 | 1,2-Dichloropropane: Ether B | 86.8 | 13.2 | 14 | 20 | 72.9 | 731.9 |
| 107 | 2,2-Dichloropropane: Ether A | 54.9 | 45.1 | 21 | >24 | 65.7 | 729.4 |
| 108 | 2,2-Dichloropropane: Ether B | 61.7 | 38.3 | 19 | >28 | 65.3 | 739.6 |
| 109 | trans-1,2-Dichloroethylene:Ether A | 37.3 | 62.7 | 22 | >24 | 45.7 | 730.6 |
| 110 | trans-1,2-Dichloroethylene:Ether B | 31.2 | 68.8 | 22 | >28 | 45.2 | 73Q.5 |
| 111 | 2,3-Dichloro-1-propene:Ether A | 81.6 | 18.4 | 14 | 21 | 73.0 | 724.6 |
| 112 | 1-Bromopropane: Ether B | 56.0 | 44.0 | 19 | 24to28 | 62.9 | 730.0 |
| 113 | Acetonitrile: Ether A | 83.0 | 17.0 | 9 | 14 | 63.8 | 726.7 |
| 114 | Acetonitrile: Ether B | 85.4 | 14.6 | 10 | 16 | 64.2 | 740.5 |

Example 115

The following Example illustrates that azeotrope-like compositions can be used for dry cleaning fabrics.

A cleaning solution was prepared using an azeotrope-like composition prepared from 37 weight percent Ether A and 63 weight percent trans-1,2-dichloroethylene, and 1 volume percent of SECULAR PERFECT, a dry cleaning detergent available from Busing and Fasch GmbH of Oldenburg, Germany, and 0.1 volume percent water.

15×15 cm swatches of a 70/30 percent polyester/wool blend fabric and a 65/35 percent polyester/cotton blend twill fabric were strained by applying, at three different sites on each fabric swatch, three drops of corn oil, three drops of mineral oil and three drops of dirty motor oil. The oil stains were then driven into the fabric swatches by placing a 11.2 kg (5 pounds) weight over the swatches for 1 minute and stains were then allowed to further set for about 1 hour.

After the stains were set, the fabric swatches were cleaned in the cleaning solution by agitating the swatches in about 500 mL of cleaning solution for about 15 minutes. The swatches were then removed, air dried and evaluated for any remaining stain using a Chromometer™ CR-300 from Minolta Camera Company of Japan. The ΔE measurements for the cleaned fabrics were only slightly greater than the unstained fabric or about 0.0 to 0.32 thus illustrating that the cleaning solution made of the azeotrope-like composition is an effective dry cleaning agent.

Example 116

Ether B can also be made according to the following procedures. Perfluoroisobutyryl fluoride, was prepared by electrochemically fluorinating isobutyric anhydride (>99% pure) in a Simons ECF cell of the type described in U.S. Pat. No. 2,713,593 (Brice et al. ) and in *Preparation, Properties and Industrial Applications of Organofluorine Compounds*, R. E. Banks, ed., John Wiley and sons, New York, 1982, pp. 19 to 43 to form a perfluoroisobutyryl fluoride product containing approximately 56 wt. % perfluoroisobutyryl fluoride, 24 wt. % perfluoro-n-butyryl fluoride and 20 wt. % percent perfluorinated, inert products.

A 600 mL stainless steel Parr pressure reactor was charged with spray-dried potassium fluoride (1.10 mole equivalents relative to perfluoroisobutyryl fluoride), anhydrous diglyme (1.0 weight equivalent relative to perfluoroisobutyryl fluoride), Adogen™464 (0.0065 mole equivalents relative to perfluoroisobutyryl fluoride, purified by dissolving in diglyme, followed by fractional distillation to remove isopropanol) and tribenzylamine (0.03 mole equivalents relative to perfluoroisobutyryl fluoride). The vessel was sealed, cooled with dry ice, charged with perfluoroisobutyryl fluoride then allowed to warm to room temperature with stirring. Diethyl sulfate (1.30 mole equivalents relative to perfluoroisobutyryl fluoride) was then charged to the reactor under pressure and the reactor held at 25° C. for 30 minutes, heated to 40° C. for an additional two hours, then heated at 60° C. for an additional 18 hours.

The reactor was then charged with aqueous potassium hydroxide (60g of 45 wt % and 50 g water) to neutralize any unreacted diethyl sulfate and stirred for 30 minutes at 85° C. until the solution pH was greater than 13. Excess aqueous hydrogen fluoride (48 wt % concentration) was added to the solution until the pH was 7–8, and the product 1-ethoxy nonafluoroisobutane fraction was distilled from the reaction mixture. The distillate was washed with water to remove small amounts of ethanol, then fractionally distilled to further purify the desired product.

Various modifications and alterations of this invention will be apparent to those skilled in the art without departing from the scope and spirit of this invention.

We claim:

1. An azeotrope-like composition including (a) perfluorobutyryl ethyl ether, consisting essentially of perfluoro-n-butyl ethyl ether and perfluoroisobutyl ethyl ether and mixtures thereof, and (b) organic solvent, which composition is selected from the group consisting of:

(i) compositions consisting essentially of about 84 to 46 weight percent of the ether and about 16 to 54 weight percent pentafluoro-1-propanol that boil at about 67 to 69° C. at 735 torr; and (ii) compositions consisting essentially of about 37 to 2 weight percent of the ether and about 63 to 98 weight percent hexafluoro-2-propanol that boil at about 56 to 58° C. at 736 torr.

2. A process for depositing a coating on a substrate surface comprising the step of applying to at least a portion of at least one surface of the substrate a liquid coating composition comprising:

(A) an azeotrope-like composition according to claim 1; and (B) at least one coating material which is soluble or dispersible in the azeotrope-like composition.

3. A coating composition consisting essentially of an azeotrope-like composition according to claim 1 and a coating material.

4. A process for removing contaminants from the surface of a substrate comprising the step of contacting the substrate with one or more of the azeotrope-like compositions according to claim 1 until the contaminants are dissolved, dispersed or displaced in or by the azeotrope-like composition, and removing the azeotrope-like composition containing the dissolved, dispersed or displaced contaminants from the surface of the substrate.

5. A process according to claim 4 wherein the azeotrope-like composition further comprises a surfactant and the substrate is a fabric.

6. An azeotrope-like composition including perfluorobutyl ethyl ether, wherein said ether consists essentially of about 18 weight percent perfluoro-n-butyl ethyl ether, and about 82 weight percent perfluoroisobutyl ethyl ether, and one organic solvent, and is selected from the group consisting of:

(i) compositions consisting essentially of the ether and pentafluoro-1-propanol, wherein the compositions, when fractionally distilled, form a distillate fraction that is an azeotrope consisting essentially of about 75 weight percent of the ether and about 25 weight percent of the pentafluoro-1-propanol that boils at about 67° C. at about 730 torr; and (ii) compositions consisting essentially of the ether and hexafluoro-2-propanol, wherein the compositions, when fractionally distilled, form a distillate fraction that is an azeotrope consisting essentially of about 35 weight percent of the ether and 65 weight percent of the and hexafluoro-2-propanol that boils at about 56° C. at about 731 torr.

7. An azeotrope-like composition according to claim 6 wherein the concentrations of the ether and the organic solvent in the azeotrope-like composition differ from the concentrations of such components in the corresponding azeotrope by no more than five percent.

8. An azeotrope-like composition according to claim 6 wherein the azeotrope-like composition is an azeotrope.

9. A process for depositing a coating on a substrate surface comprising the step of applying to at least a portion of at least one surface of the substrate a liquid coating composition comprising:

(A) an azeotrope-like composition according to claim 6; and (B) at least one coating material which is soluble or dispersible in the azeotrope-like composition.

10. A coating composition consisting essentially of an azeotrope-like composition according to claim 6 and a coating material.

11. A process for removing contaminants from the surface of a substrate comprising the step of contacting the substrate with one or more of the azeotrope-like compositions according to claim 6 until the contaminants are dissolved, dispersed or displaced in or by the azeotrope-like composition, and removing the azeotrope-like composition containing the dissolved, dispersed or displaced contaminants from the surface of the substrate.

12. A process according to claim 11 wherein the azeotrope-like composition further comprises a surfactant and the substrate is a fabric.

* * * * *